(12) United States Patent
Jackson (10) Patent No.: US 7,266,431 B2
(45) Date of Patent: Sep. 4, 2007

(54) ALL TERRAIN VEHICLES (ATVS) AND ALL VEHICLE (ATV) CAUTIONARY LIGHT ASSEMBLIES

(76) Inventor: Stephen L. Jackson, 171 Manor Dr., Libby, MT (US) 59923

( * ) Notice: Subject to any disclaimer, the term of this patent is extended or adjusted under 35 U.S.C. 154(b) by 257 days.

(21) Appl. No.: 11/014,144

(22) Filed: Dec. 15, 2004

(65) Prior Publication Data

US 2006/0126351 A1    Jun. 15, 2006

(51) Int. Cl.
*G06F 3/00* (2006.01)
*B60Q 1/26* (2006.01)

(52) U.S. Cl. .............................. 701/1; 701/36; 362/459; 362/487

(58) Field of Classification Search .................... 701/1, 701/36; 307/9.1, 10.1, 10.8; 340/468, 471–472, 340/901; 362/459, 487
See application file for complete search history.

(56) References Cited

U.S. PATENT DOCUMENTS

| | | | | |
|---|---|---|---|---|
| 2,324,614 A | * | 7/1943 | Dalton | ...................... 116/28 R |
| 3,117,549 A | * | 1/1964 | Ripepe | ...................... 116/28 R |
| 3,143,722 A | * | 8/1964 | Murch | .......................... 340/472 |
| 3,242,901 A | * | 3/1966 | Olson | .......................... 116/173 |
| 3,895,348 A | * | 7/1975 | Palermo | ...................... 340/472 |
| 4,632,354 A | * | 12/1986 | Asciutto | ...................... 248/539 |
| 4,800,986 A | | 1/1989 | Hayes, III | |
| 5,938,395 A | | 8/1999 | Dumont, Jr. | |
| 6,113,116 A | | 9/2000 | Stanton et al. | |
| 6,457,618 B1 | | 10/2002 | Hancock et al. | |

* cited by examiner

*Primary Examiner*—Y. Beaulieu
(74) *Attorney, Agent, or Firm*—Wells St. John, P.S.

(57) ABSTRACT

All terrain vehicles and all terrain vehicle cautionary light assemblies are described according to some aspects. In one aspect, an all terrain vehicle (ATV) includes a frame, a seat coupled with the frame and configured to support an operator, a plurality of wheels coupled with the frame, and a cautionary light assembly configured to couple a cautionary light with the all terrain vehicle, wherein the cautionary light assembly is configured to provide the cautionary light in a position wherein the cautionary light is elevationally above a directional control of the all terrain vehicle and substantially out of a direct line of sight of the operator during operation of the all terrain vehicle by the operator wherein the operator is seated upon the seat and looking in a forward direction with respect to the all terrain vehicle.

29 Claims, 6 Drawing Sheets

Fig. 1

ALL TERRAIN VEHICLES (ATVS) AND ALL VEHICLE (ATV) CAUTIONARY LIGHT ASSEMBLIES

TECHNICAL FIELD

This invention relates to all terrain vehicles (ATVs) and all terrain vehicle (ATV) cautionary light assemblies.

BACKGROUND OF THE DISCLOSURE

All terrain vehicles, commonly referred to as ATVs, have experienced expansive growth, innovation and popularity with users in recent decades. All terrain vehicles have been utilized for both pleasure and recreational pursuits as well as to fill utilitarian needs. For example, all terrain vehicles may be outfitted to pull objects and traverse great distances for surveying, ranching, hunting, etc. In addition, all terrain vehicles may be equipped to implement more specialized functions. In one example, all terrain vehicles may be configured with plow assemblies to perform snow removal operations of drive ways, parking lots, etc. Accordingly, in at least some applications, operators of all terrain vehicles may be used in proximity to automobiles or otherwise encounter potentially dangerous situations with respect to other vehicles. At least some aspects of the disclosure provide increased visibility of operators of all terrain vehicles and the vehicles themselves.

BRIEF DESCRIPTION OF THE DRAWINGS

Aspects of the disclosure are described below with reference to the following accompanying drawings.

DETAILED DESCRIPTION

According to one aspect of the disclosure, an all terrain vehicle (ATV) comprises a frame, a seat coupled with the frame and configured to support an operator, a plurality of wheels coupled with the frame, and a cautionary light assembly configured to couple a cautionary light with the all terrain vehicle, wherein the cautionary light assembly is configured to provide the cautionary light in a position wherein the cautionary light is elevationally above a directional control of the all terrain vehicle substantially and out of a direct line of sight of the operator during operation of the all terrain vehicle by the operator wherein the operator is seated upon the seat looking in a forward direction with respect to the all terrain vehicle.

According to another aspect of the disclosure, an all terrain vehicle (ATV) cautionary light assembly comprises a coupling assembly configured to couple with an all terrain vehicle, a support member coupled with the coupling assembly, a light coupling member coupled with the support member and configured to couple with a cautionary light, and wherein the support member is configured to provide the cautionary light at a position elevationally above a directional control of the all terrain vehicle and substantially out of a direct line of sight of an operator of the all terrain vehicle when the operator is seated upon a seat of the all terrain vehicle and looking in a forward direction during operation of the all terrain vehicle.

Figure 1:
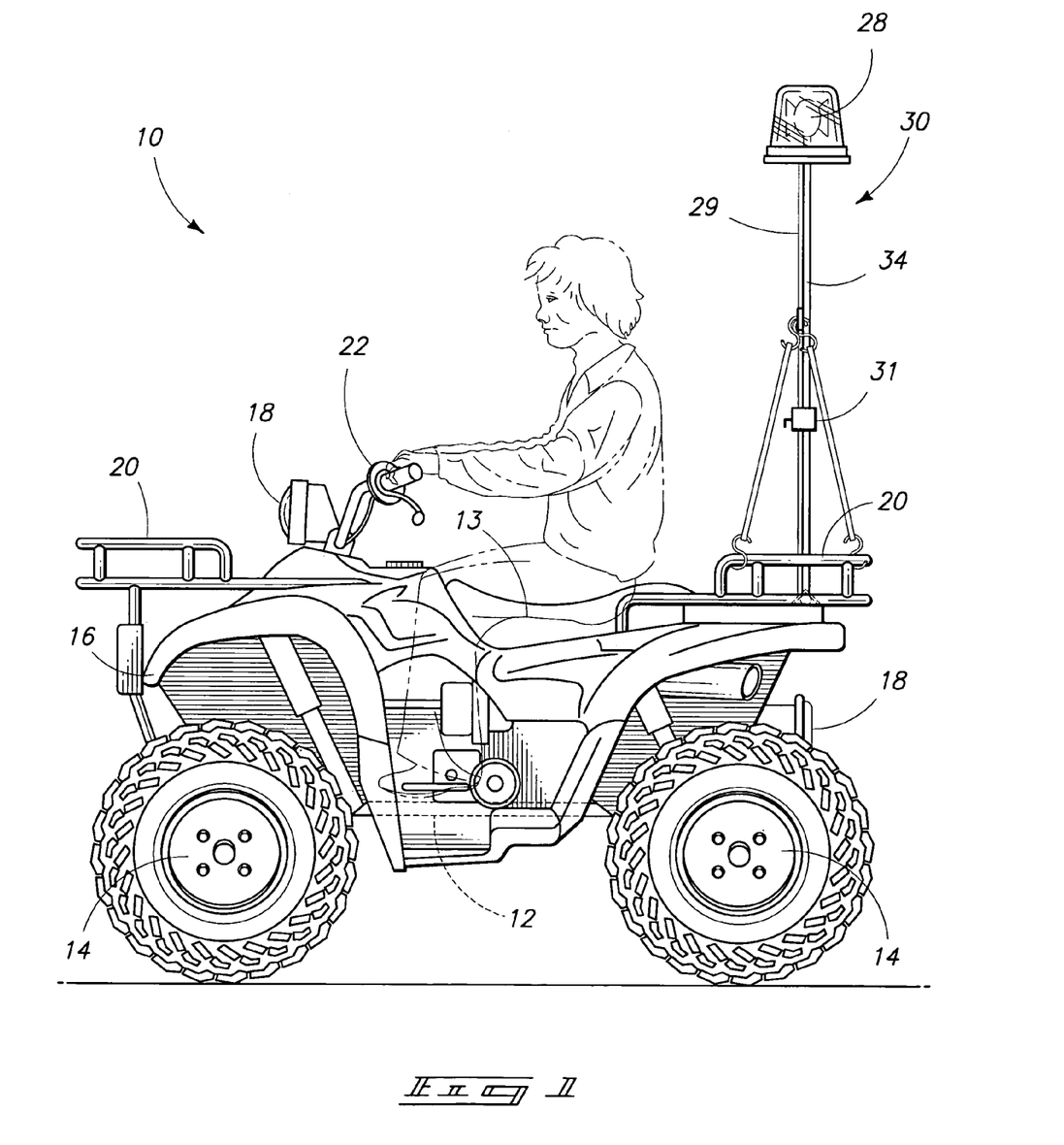
FIG. 1 is an illustrative representation of an all terrain vehicle having a cautionary light assembly according to one embodiment.

Referring to FIG. 1, an exemplary configuration of an all terrain vehicle 10 is shown with respect to one embodiment. The depicted all terrain vehicle 10 includes a frame 12 coupled with a plurality of wheels 14. In the depicted configuration of FIG. 1, all terrain vehicle 10 includes four wheels 14 although other configurations are possible, such as three wheeled vehicles.

All terrain vehicle 10 may include a seat 13 coupled with frame 12 and configured to support an operator. All terrain vehicle 10 may also include a body 16 which may be configured to cover and protect internal components of all terrain vehicle. 10. A plurality of operational lights 18 may be provided to implement lighting operations such as forward operational lighting for operation of all terrain vehicle 10 in low light environments, brake lights at the aft of vehicle 10, etc.

All terrain vehicle 10 may also be equipped with front and/or rear racks 20. Racks 20 may be used to support cargo in typical implementations. All terrain vehicle 20 also includes a directional control 22 which may be accessed by an operator to control the direction of forward and rearward movement of all terrain vehicle 10. In the depicted exemplary configuration of FIG. 1, directional control 22 is implemented as a pair of handlebars which may have throttle controls, braking, lighting controls, and/or other desired control apparatus.

In accordance with aspects of the disclosure, a cautionary light 28 is coupled with all terrain vehicle 10 to increase the visibility of all terrain vehicle 10 to others in the vicinity of all terrain vehicle 10, such as automobile operators. In the exemplary embodiment of FIG. 1, cautionary light 28 is configured as a rotating strobe light including, for example, an incandescent amber light, red light, etc. Additional aspects of the disclosure include a cautionary light assembly 30 configured to couple cautionary light 28 with all terrain vehicle 10. An electrical light connection 29 (e.g., wire) may connect cautionary light 28 with an appropriate electrical power source, such as a battery of all terrain vehicle 10 (e.g., 12 Volt DC power), an auxiliary power source, etc. Exemplary configurations of cautionary light assemblies 30 are described with respect to the embodiments of FIGS. 2-2G. Other configurations of assemblies 30 apart from are those shown in FIGS. 2-2G are possible according to other embodiments.

Some embodiments of cautionary light assembly 30 provide usage of the cautionary light 28 to increase the visibility of all terrain vehicle 10 and the operator thereof with reduced or minimal impact to the operator in regards to their operation of the all terrain vehicle 10. According to exemplary embodiments, cautionary light assembly 30 is configured to enable aft mounting of the cautionary light 28 behind the position of the operator as shown in FIG. 1. Referring to the example of FIG. 1, the operator may look forward (i.e., to the left in FIG. 1) while the cautionary light assembly 30 is mounted behind the operator and out of the direct line of sight of the operator during normal operation of all terrain vehicle 10 in a forward direction. The direct line of sight refers to a line of sight of the operator during typical forward operation of all terrain vehicle 10 and may be generally parallel with the ground.

Although cautionary light assembly 30 is depicted directly behind the operator in the embodiment of FIG. 1, other positioning of cautionary light assembly 30 with respect to all terrain vehicle 10 is possible. For example, if a line of sight of the operator is directly straight ahead in a forward direction, cautionary light assembly 30 may be positioned outside of an angle of 30 degrees on either side of the line of sight in the forward direction to reduce the impact of the light upon the operator during normal forward operation. In other embodiments, the cautionary light assembly 30 may be positioned outside of an angle of 45 degrees or more (e.g., behind the operator as shown in FIG. 1) on either side of a straightforward line of sight. The positioning of the cautionary light 28 described with respect to FIG. 1 also reduces light emitted from cautionary light 28 from being in direct alignment with the eyes of an operator while boarding the all terrain vehicle 10.

In addition, a height of cautionary light assembly 30 may be selected to provide the cautionary light 28 above the directional control 22 and head of the operator to reduce the impact of light emitted from cautionary light 28 upon the operator including during operations wherein the operator looks in a rearward direction (e.g., the operator is looking behind the vehicle during operation of all terrain vehicle 10 in reverse). The height may be selected to provide the cautionary light 28 above the direct line of sight of an operator (e.g., substantially parallel to the ground) looking rearward or to the side with respect to all terrain vehicle 10.

In the embodiment of FIG. 1, an adjustment assembly 31 may be provided to allow operators to adjust the length of light support member 34 thereby permitting adjustment of the elevational height positioning of cautionary light 28 to accommodate users of different heights. An exemplary adjustment assembly 31 may operate with light support member 34 implemented as two separate sections movable with respect to one another (e.g., one section may slide within the other in one embodiment). For example, adjustment assembly 31 may include a pin configured to mate with plural holes formed in the sections of member 34 to enable the adjustment. Other configurations are possible.

The provision of the cautionary light 28 at a height above directional control 22 and the head of the operator makes cautionary light 28 highly visible to other vehicles in directions 360 degrees about the all terrain vehicle 10 (e.g., during usage in a parking lot). Further, the height may be selected to permit the all terrain vehicle 10 to enter and/or exit a garage without requiring removal of the cautionary light assembly 30. In one embodiment, cautionary light assembly 30 is configured to extend upward to position cautionary light 28 approximately 40 inches above seat 13 of the all terrain vehicle 10 and which may be suitable for a majority of operators. Other heights may be used to accommodate operators of different heights or for other reasons.

Various components of all terrain vehicle 10 and cautionary light assembly 30 are described as being in a coupled arrangement with other components of vehicle and/or assembly 30. Coupling may refer to indirect coupling wherein a given component may be coupled with another component via an intermediate component, or direct coupling. Direct coupling refers to coupling arrangements wherein plural components are directly coupled with one another and may or may not contact one another.

Referring to FIG. 2, additional details of the exemplary cautionary light assembly 30 depicted in FIG. 1 are shown. Cautionary light assembly 30 includes a light coupling member 32, a support member 34, and a coupling assembly 36, and an anchor bar 40 in the illustrated exemplary embodiment.

Light coupling member 32 defines a light support base which is configured to receive and support cautionary light 28. Light coupling member 32 may be constructed of metal (e.g., a steel plate) and some arrangements of cautionary lights 28 include magnetic members for affixing the cautionary lights 28 to light coupling member 32. Light coupling member 32 may comprise any appropriate arrangement for supporting cautionary light 28 and is a square of 6"×6" and ³⁄₁₆" thick in one embodiment.

Light support member 34 provides cautionary light 28 at a desired elevation as described above. In one embodiment, light support member 34 is approximately 42" in length and comprises ¾"×¾" square steel tubing with a wall thickness of 0.65". Other lengths or constructions of light support member 34 are possible.

The illustrated cautionary light assembly 30 includes a coupling assembly 36 configured to couple the cautionary light assembly 30 with respect all terrain vehicle 10. Cautionary light assembly 30 may be configured for removable attachment with respect to all terrain vehicle 10 in one embodiment wherein cautionary light assembly 30 may be conveniently attached or removed from all terrain vehicle 10 during normal operation without damage to all terrain vehicle 10 or cautionary light assembly 30.

In the embodiment of FIG. 2, coupling assembly 36 is provided at a base end of light support member 34 and includes a plurality of engagement members 38 configured to couple with all terrain vehicle 10. The exemplary engagement members 38 of FIG. 2 form an upside down "V" having a groove to receive a bar of rack 20. In one installation embodiment, coupling assembly 36 is attached to a bar at the center of rack 20. Covers 37 may be provided to slip over engagement members 38. For example, engagement members 38 may comprise steel and the covers 37 may comprise vinyl and which are provided intermediate the engagement members 38 and the all terrain vehicle 10 during installation. Covers 37 may reduce slippage of the coupling assembly 36 with respect to rack 20 and/or reduce marring of finishes of cautionary light assembly 30 and/or rack 20.

An anchor bar 40 is coupled to light support member 34 at a position between opposing ends of the light support member 34. Anchor bar 40 has a plurality of holes located at opposing sides of light support member 34 to receive hooks of anchor members 42. The other ends of anchor members 42 may be affixed to the rack 20 or other desired anchoring points of all terrain vehicle 10. Exemplary anchor members 42 have a marketing designation of "EZ-Cinch" providing a two-to-one energy ratio for securely affixing cautionary light assembly 30 to all terrain vehicle 10 and providing stability to cautionary light assembly 30 mounted to all terrain vehicle 10. Four anchor members 42 may be attached to anchor bar 40 for a quad-pod or four-way guy type of attachment to positions of the rear rack 20 (e.g., substantially located at four corners of rack 20 in one attachment arrangement). Collectively, the anchor members 42 operate to restrain movement of support member 34 in x, y, and z axis directions in the above-described embodiment. For example, opposing anchor members 42 provide opposing forces to anchor bar 40 of support member 34 providing increased support to the cautionary light assembly 30. In one exemplary embodiment, anchor bar 40 is provided at approximately 60% of the overall height of light support member 34. In the described embodiment of FIG. 2, anchor bar 40 is positioned at a height "h" of approximately 24" above the top of the coupling assembly 36.

Figure 2:
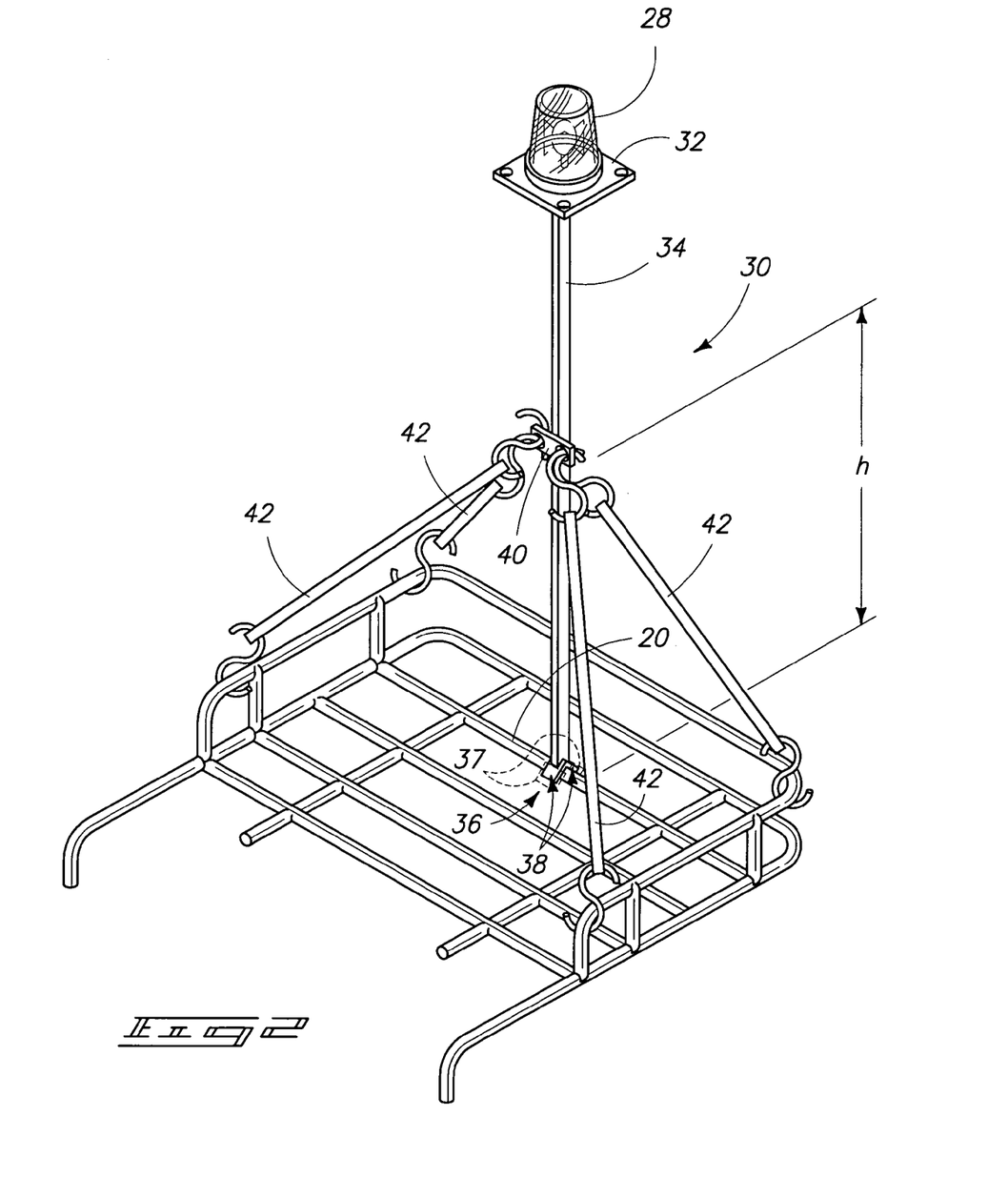
FIGS. 2A-2G are illustrative representations of different configurations of exemplary cautionary light assemblies according to a plurality of embodiments.
Figure 2A:
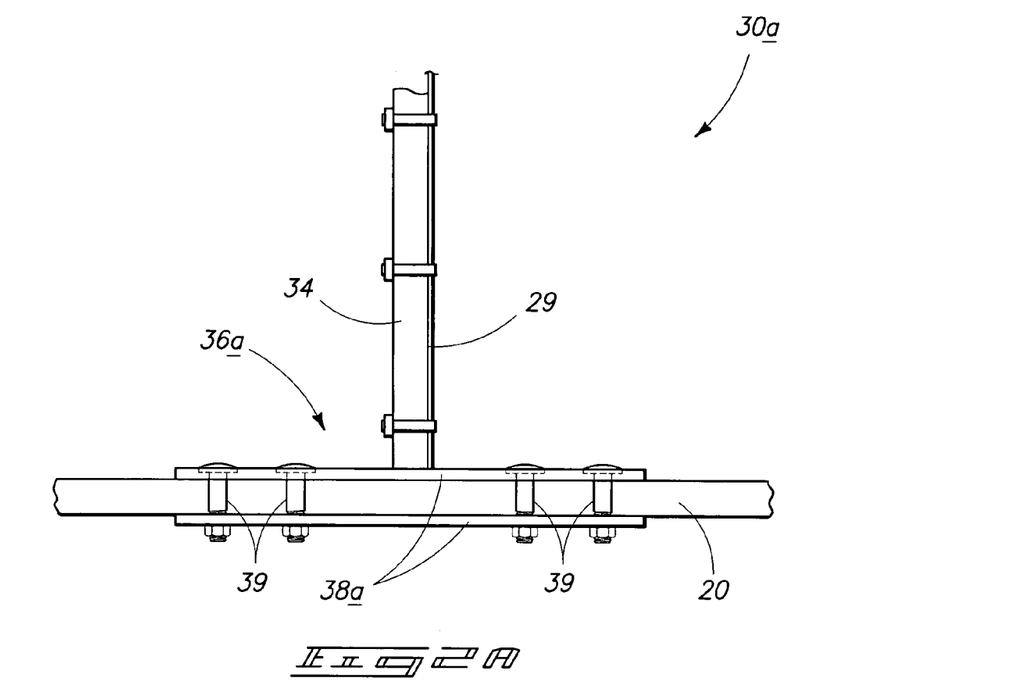

Referring to FIG. 2A, another embodiment of cautionary light assembly 30a is shown. Cautionary light assembly 30a shown in FIG. 2A includes coupling assembly 30a at a base end of light support member 34. Coupling assembly 36a includes engagement members 38a provided in the form of clamping style sandwich plates which are provided at opposite sides of a bar of rack 20. A plurality of bolts 39 may be used to securely affix engagement members 38a of coupling assembly 36a to rack 20.

Figure 2B:
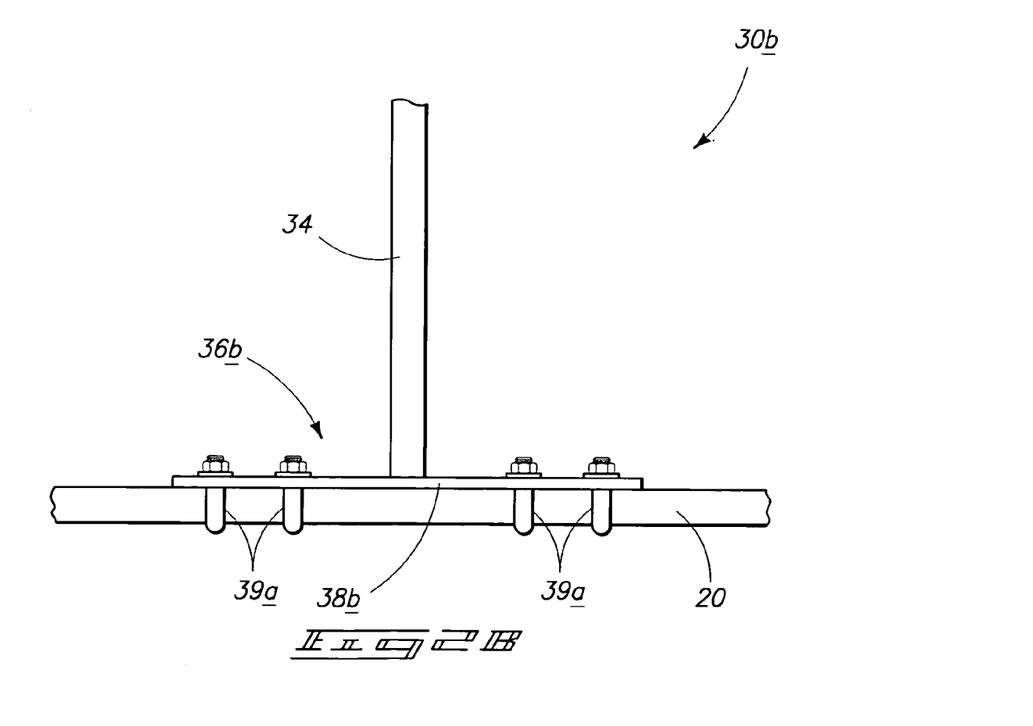

Referring to FIG. 2B, another embodiment of cautionary light assembly 30b including a coupling assembly 36b is shown. Coupling assembly 36b includes an engagement member 38b comprising a flat steel plate attached to a bar of rack 20 using plural U-bolts 39a.

Figure 2C:
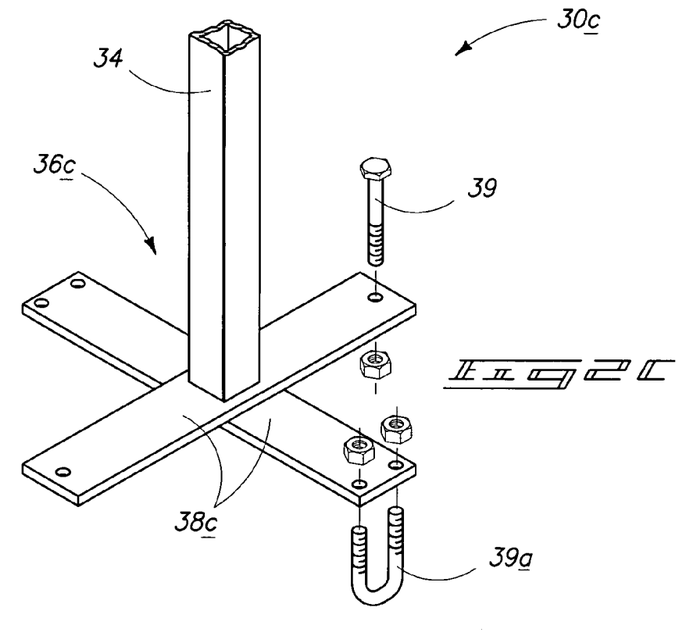

Referring to FIG. 2C, another embodiment of cautionary light assembly 30c including a coupling assembly 36c is shown. Coupling assembly 36c includes plural engagement members 38c comprising steel and elongated in axes perpendicular to one another in the shape of a cross and configured to connect with all terrain vehicle 10 in a plurality of different directional axes (e.g., x and z in the illustrated embodiment). Different configurations of bolts 39, 39a may be used depending upon the type of rack 20 to be engaged. For example, racks of all terrain vehicles 10 implemented as flat boards (not shown) may be drilled to receive bolts 39 for securing engagement members 38c to rack 20. U-bolts 39a may be used for attachment to racks 20 having bars as shown in FIG. 1. Individual ones of engagement members 38c may include a plurality of appropriate holes for use with bolts 39 or U-bolts 39a.

Figure 2D:
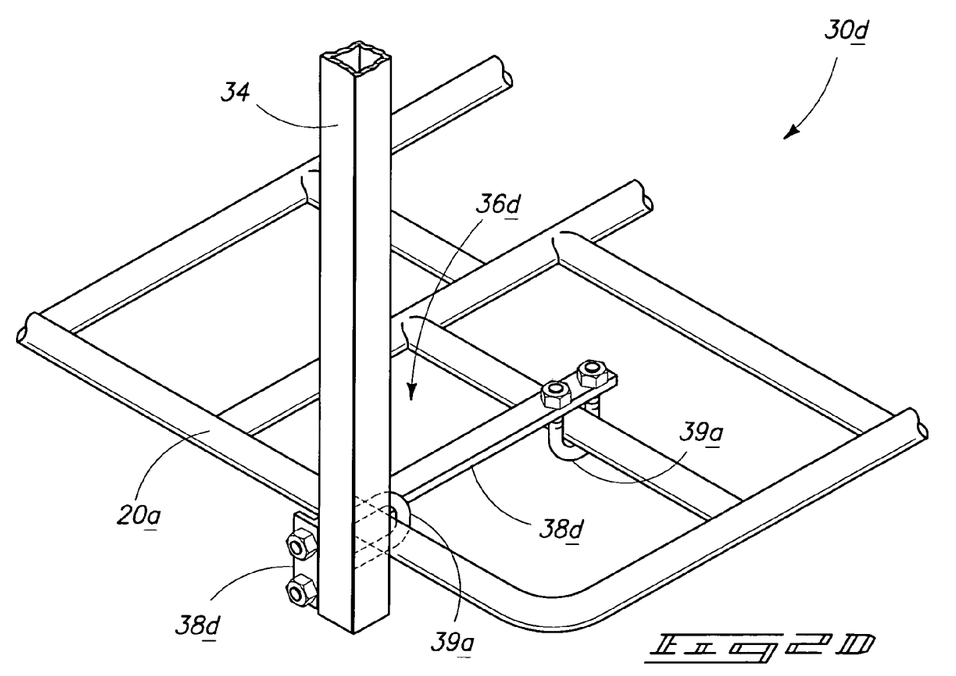

Referring to FIG. 2D, another embodiment of cautionary light assembly 30d including a coupling assembly 36d is shown. Coupling assembly 36d comprises an "L" bracket attached to support member 34 to define plural engagement members 38d which are provided in axes perpendicular to one another. Plural U-bolts 39a may be used to attach the engagement members 38d to plural bars of rack 20a.

Figure 2E:
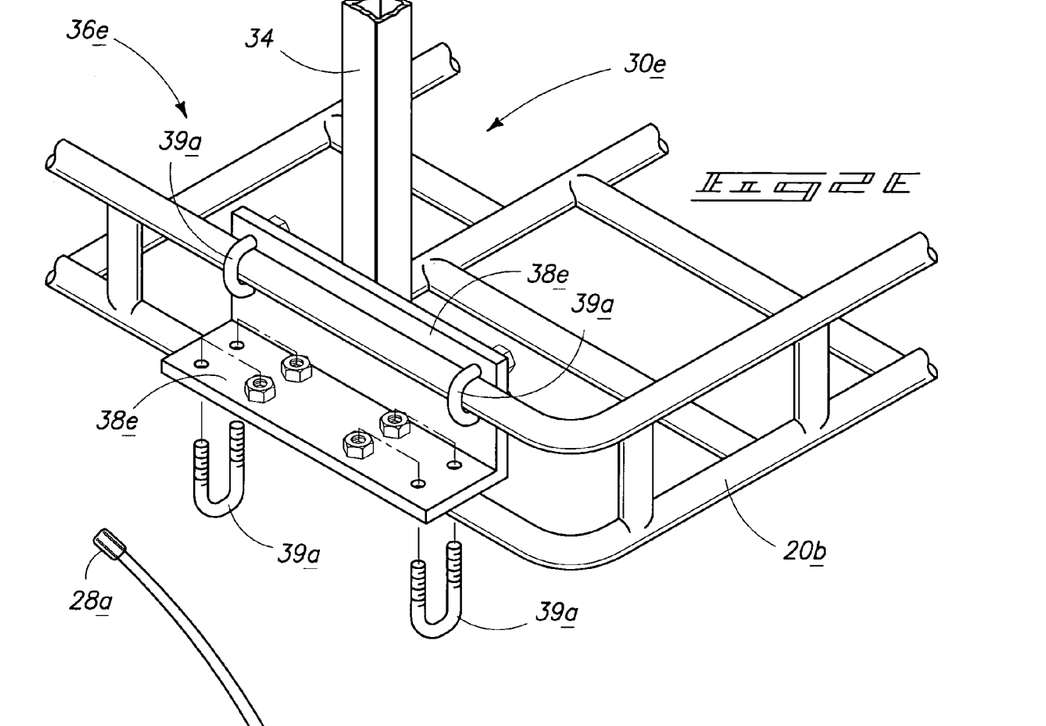

Referring to FIG. 2E, another embodiment of cautionary light assembly 30e including a coupling assembly 36e is shown. Coupling assembly 36e comprises an angle iron bracket attached to support member 34. Coupling assembly 38e defines plural engagement members 38e which are perpendicular to one another and may be attached by U-bolts 39a to plural bars of rack 20b. Support member 34 may be attached to one of the engagement members 38e in the illustrated exemplary embodiment.

Figure 2F:
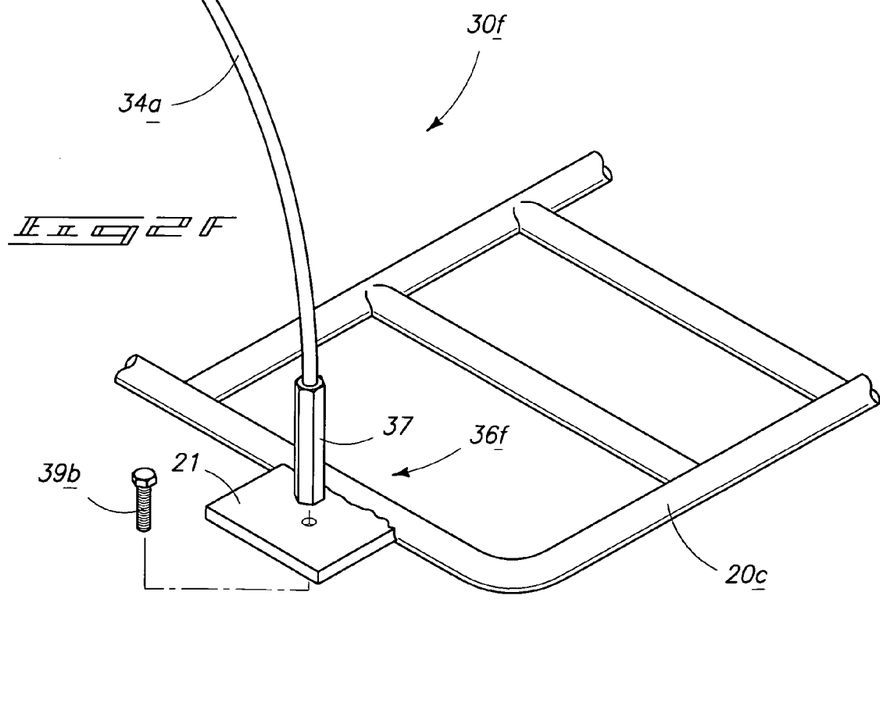
Figure 2G:
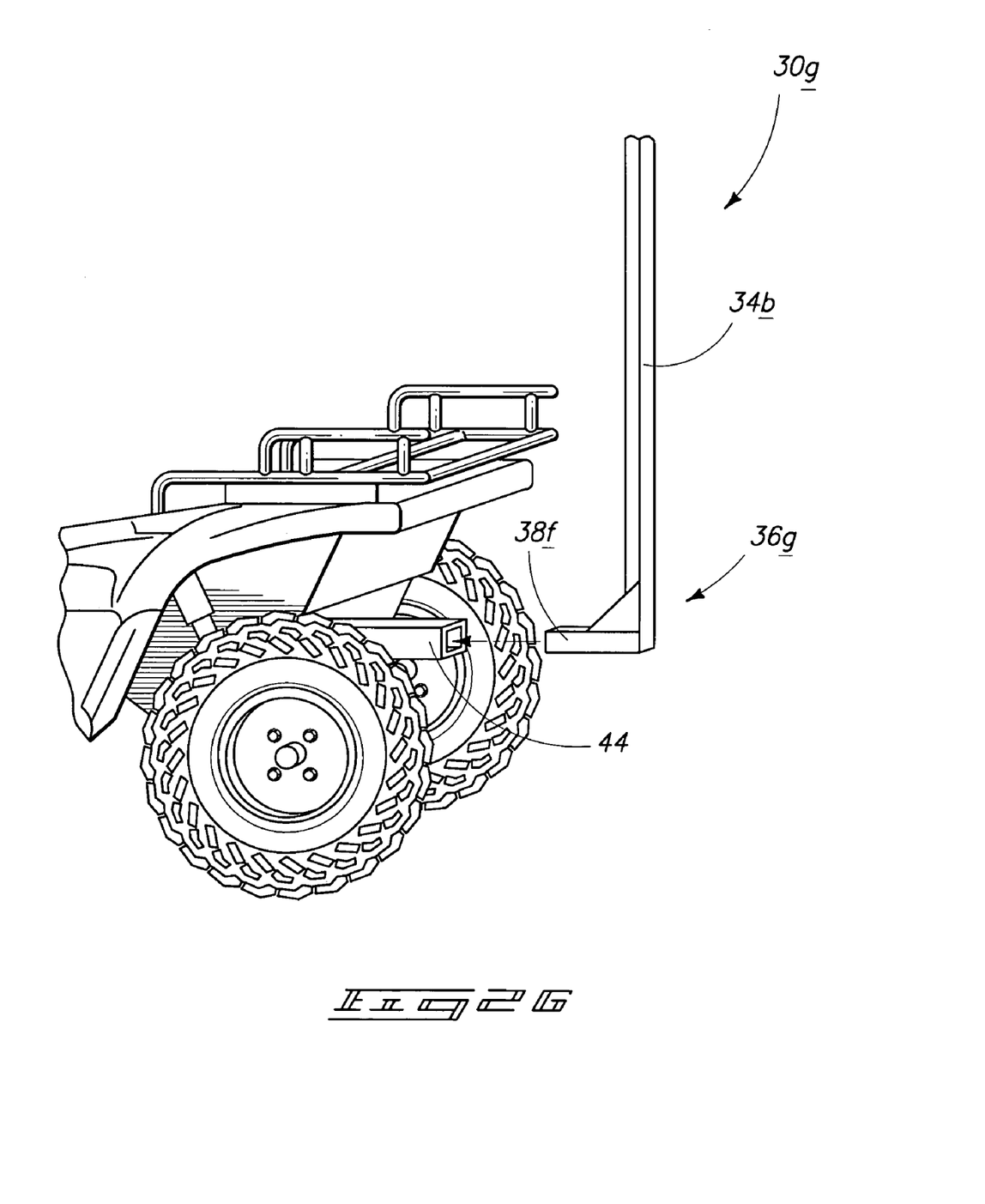

Referring to FIG. 2F, another embodiment of cautionary light assembly 30f including a coupling assembly 36f is shown. Assembly 36f includes a support member 34a comprising a flexible whip. The illustrated rack 20c includes a tab 21 configured to receive a base 37 of support member 34a and a bolt 39b for attachment of cautionary light assembly 30f to all terrain vehicle 10. FIG. 2F also depicts an alternative arrangement of cautionary light 28a comprising a plurality of light emitting diodes (LEDs).

Referring to FIG. 2G, another embodiment of cautionary light assembly 30g including a coupling assembly 36g is shown. Coupling assembly 36g includes an engagement member 38f comprising a post for attachment to a receiver 44 of all terrain vehicle 10. A pin (not shown) may be used to lock engagement member 38f with respect to receiver 44. The length of support member 34b may be increased in the embodiment of FIG. 2G to provide a position of cautionary light 28 at a desired height as discussed above.

Aspects of the disclosure provide all terrain vehicles and caution light assemblies which provide increased visibility to users of all terrain vehicles. The increased visibility should enhance the safety of the operators while engaged in activities around traffic, such as plowing snow. At least some embodiments feature relatively easy universal installation with minimal or no modification to the all terrain vehicles and which permit quick and convenient installation and/or removal. At least some embodiments of the cautionary light assemblies do not require rigid attachment to the all terrain vehicles and may be less susceptible to metal fatigue or cracking.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An all terrain vehicle (ATV) comprising:
an all terrain vehicle frame;
a seat coupled with the all terrain vehicle frame and configured to support an operator;
a plurality of wheels coupled with the all terrain vehicle frame; and
a cautionary light assembly configured to couple a cautionary light with the all terrain vehicle, wherein the cautionary light assembly is configured to provide the cautionary light in a position wherein the cautionary light is elevationally above a directional control of the all terrain vehicle and substantially out of a direct line of sight of the operator during operation of the all terrain vehicle by the operator wherein the operator is seated upon the seat and looking in a forward direction with respect to the all terrain vehicle.

2. The vehicle of claim 1 wherein the cautionary light assembly is configured to provide the cautionary light in the position elevationally above the head of the operator and out of the direct line of sight of the operator when the operator is looking in a rearward or side direction with respect to the all terrain vehicle.

3. The vehicle of claim 1 wherein the line of sight includes angles of 30 degrees to either side of a straight line of forward travel of the all terrain vehicle.

4. The vehicle of claim 1 wherein the cautionary light assembly is configured to provide the cautionary light in the position aft of the seat.

5. The vehicle of claim 1 wherein the cautionary light assembly comprises a flexible whip configured to support the cautionary light.

6. The vehicle of claim 1 further comprising a rack coupled with the all terrain vehicle frame, and wherein the cautionary light assembly is directly coupled with the rack.

7. The vehicle of claim 6 wherein the cautionary light assembly comprises:
a support member configured to support the cautionary light; and
a plurality of anchor members configured to anchor the support member with respect to the rack.

8. The vehicle of claim 7 wherein the anchor members comprise four anchor members configured to couple with a plurality of anchor locations positioned at substantially four corners of the rack.

9. The vehicle of claim 7 wherein the anchor members are configured to restrain movement of the support member in different axes.

10. The vehicle of claim 7 wherein the anchor members are individually configured to provide a force to the support member in a direction at least partially opposite to a force provided by an other of the anchor members.

11. The vehicle of claim 10 wherein the anchor members are individually configured to provide the respective force to a position of the support member elevationally above and spaced from the rack and intermediate opposing ends of the support member.

12. The vehicle of claim 11 wherein the anchor members are coupled with the position of the support member located approximately 60% of a length of the support member above a base of the support member.

13. The vehicle of claim 1 further comprising a receiver of a hitch which is coupled with the all terrain vehicle frame, and wherein the cautionary light assembly is configured to couple with the receiver of the hitch.

14. The vehicle of claim 1 further comprising the cautionary light.

15. The vehicle of claim 14 wherein the cautionary light is configured to emit light in directions of 360 degrees about the all terrain vehicle.

16. The vehicle of claim 1 further comprising an adjustment assembly configured to permit the operator to adjust the elevational height positioning of the cautionary light with respect to the directional control.

17. An all terrain vehicle (ATV) cautionary light assembly comprising:
   a coupling assembly configured to couple with an all terrain vehicle;
   a support member coupled with the coupling assembly;
   a light coupling member coupled with the support member and configured to couple with a cautionary light;
   wherein the support member is configured to provide the cautionary light at a position elevationally above a directional control of the all terrain vehicle and substantially out of a direct line of sight of an operator of the all terrain vehicle when the operator is seated upon a seat of the all terrain vehicle and looking in a forward direction during operation of the all terrain vehicle; and
   wherein the coupling assembly comprises a plurality of engagement members configured to couple with opposing sides of a portion of a rack of the all terrain vehicle.

18. The light assembly of claim 17 wherein the line of sight includes angles of 30 degrees to either side of a straight line of forward travel of the all terrain vehicle.

19. The light assembly of claim 17 wherein the coupling assembly is configured to removably couple with the all terrain vehicle.

20. The light assembly of claim 17 wherein the engagement members are configured to define a groove to receive the portion of the rack of the all terrain vehicle.

21. The light assembly of claim 17 wherein the engagement members are configured to connect with the all terrain vehicle in a plurality of different directional axes.

22. The light assembly of claim 17 further comprising covers received over the engagement members and provided intermediate the engagement members and the all terrain vehicle during coupling of the light assembly and the all terrain vehicle, and wherein the covers comprise a material different than a material of the support members.

23. The light assembly of claim 17 wherein the engagement members are elongated in perpendicular directions with respect to one another.

24. The light assembly of claim 17 wherein the support member comprises a flexible whip.

25. The light assembly of claim 17 further comprising the cautionary light.

26. The vehicle of claim 1 wherein the cautionary light assembly comprises a support member configured to support the cautionary light and to removably couple with the all terrain vehicle.

27. The vehicle of claim 6 wherein the cautionary light assembly comprises a support member configured to support the cautionary light, and wherein the support member comprises a groove configured to directly couple with a portion of the rack.

28. The light assembly of claim 17 wherein the engagement members are configured to couple with the opposing sides of the portion of the rack comprising a bar.

29. The light assembly of claim 28 wherein the engagement members are configured to couple with the bar which is elongated in a substantially horizontal direction.

* * * * *